United States Patent
Seo (10) Patent No.: US 8,778,529 B2
(45) Date of Patent: Jul. 15, 2014

(54) LITHIUM SECONDARY BATTERY

(75) Inventor: Kyung-Won Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1574 days.

(21) Appl. No.: 11/287,483

(22) Filed: Nov. 28, 2005

(65) Prior Publication Data

US 2006/0127756 A1 Jun. 15, 2006

(30) Foreign Application Priority Data

Nov. 29, 2004 (KR) .................. 10-2004-0098853
Mar. 23, 2005 (KR) .................. 10-2005-0024235

(51) Int. Cl.
| | |
|---|---|
| *H01M 14/00* | (2006.01) |
| *H01M 2/00* | (2006.01) |
| *H01M 2/04* | (2006.01) |
| *H01M 2/02* | (2006.01) |
| *H01M 2/08* | (2006.01) |
| *H01M 2/06* | (2006.01) |
| *H01M 2/34* | (2006.01) |
| *H01M 10/42* | (2006.01) |
| *H01M 10/0525* | (2010.01) |

(52) U.S. Cl.
CPC .......... *H01M 2/0257* (2013.01); *H01M 2/0267* (2013.01); *H01M 2/0277* (2013.01); *H01M 2/028* (2013.01); *H01M 2/0482* (2013.01); *H01M 2/06* (2013.01); *H01M 2/34* (2013.01); *H01M 10/425* (2013.01); *H01M 10/0525* (2013.01); *H01M 2/0217* (2013.01)
USPC ............... 429/179; 429/7; 429/163; 429/175; 429/176; 429/177; 429/178; 429/180

(58) Field of Classification Search
CPC ............ H01M 2/0257; H01M 2/0267; H01M 2/0277; H01M 2/028; H01M 2/048
USPC ................................ 429/61, 175–180, 7, 163
See application file for complete search history.

(56) References Cited

U.S. PATENT DOCUMENTS

| | | | | |
|---|---|---|---|---|
| 6,225,778 | B1 * | 5/2001 | Hayama et al. | ............... 320/112 |
| 2002/0018932 | A1 | 2/2002 | Chikada | |
| 2002/0031703 | A1 * | 3/2002 | Kameyama et al. | .......... 429/162 |
| 2002/0034683 | A1 * | 3/2002 | Takeshita et al. | ............. 429/123 |

(Continued)

FOREIGN PATENT DOCUMENTS

| | | |
|---|---|---|
| CN | 1470081 A | 1/2004 |
| JP | 2001319633 | 11/2001 |

(Continued)

OTHER PUBLICATIONS

Machine Translation of JP 2003-017012, relied upon herein. (Hirota, Battery, Jan. 17, 2003).*

(Continued)

*Primary Examiner* — Eugenia Wang
(74) *Attorney, Agent, or Firm* — Robert E. Bushnell, Esq.

(57) ABSTRACT

A lithium secondary battery includes: a bare cell having an electrode assembly and a case for containing the electrode assembly; a protection circuit module connected to the bare cell; and a cover enclosing the protection circuit module and the bare cell and having an external terminal electrically connected to electrodes of the electrode assembly, wherein a part of the cover is a molded portion made of resin using a mold.

16 Claims, 6 Drawing Sheets

(56) References Cited

U.S. PATENT DOCUMENTS

| | | | |
|---|---|---|---|
| 2003/0134189 A1* | 7/2003 | Kanai et al. | 429/156 |
| 2003/0180582 A1* | 9/2003 | Masumoto et al. | 429/7 |
| 2004/0038126 A1 | 2/2004 | Gu | |
| 2004/0091770 A1* | 5/2004 | kim | 429/180 |
| 2004/0234848 A1* | 11/2004 | Chung et al. | 429/181 |
| 2005/0130030 A1 | 6/2005 | Watanabe et al. | |
| 2005/0164080 A1 | 7/2005 | Kozu et al. | |
| 2006/0068281 A1* | 3/2006 | Hiratsuka et al. | 429/185 |

FOREIGN PATENT DOCUMENTS

| | | |
|---|---|---|
| JP | 2001351589 | 12/2001 |
| JP | 2002050329 | 2/2002 |
| JP | 2002-134077 A | 5/2002 |
| JP | 2002-166447 A | 6/2002 |
| JP | 2002-260609 A | 9/2002 |
| JP | 2002-260621 | 9/2002 |
| JP | 2003-017012 A | 1/2003 |
| JP | 2003234096 | 8/2003 |
| JP | 2003257389 A | 9/2003 |
| JP | 2004022524 | 1/2004 |
| JP | 2004031169 | 1/2004 |
| KR | 1020010104136 A | 11/2001 |
| KR | 1020030035185 A | 5/2003 |
| KR | 1020040022713 A | 3/2004 |
| WO | WO2004055924 * | 7/2004 |

OTHER PUBLICATIONS

Japanese Office Action issued by JPO, dated Mar. 29, 2011, corresponding to Japanese Patent Application No. 2005-344707.

* cited by examiner

LITHIUM SECONDARY BATTERY

CLAIM OF PRIORITY

This application makes reference to, incorporates the same herein, and claims all benefits accruing under 35 U.S.C. §119 from applications earlier filed in the Korean Intellectual Property Office on Nov. 29, 2004 and Mar. 23, 2005 and there duly assigned Serial Nos. 2004-0098853 and 2005-0024235, respectively.

BACKGROUND OF THE INVENTION

1. Field of the Invention

The present invention relates to a lithium secondary battery, and more particularly, to an exterior structure of a lithium secondary battery.

2. Description of Related Art

Secondary (rechargeable) batteries are classified into a nickel-cadmium (Ni—Cd) battery, a nickel-hydrogen (Ni-MH) battery, a lithium (Li) battery, a lithium-ion battery depending on an electrodes (intercalation hosts) used therein.

Particularly, since a lithium secondary battery has a drive voltage of 3.6V, which is about three times that of a Ni—Cd battery or a Ni-MH battery, and a high energy density per a unit weight, the lithium secondary battery is being widely adopted in the art.

In the lithium secondary battery, a lithium-based oxide is used as a positive activation material, and a carbon-based material is used a negative activation material. Further, the lithium secondary battery can be classified into a liquid electrolyte battery and a polymer electrolyte battery depending on an electrolyte used therein. The liquid electrolyte battery is often called as a lithium ion battery, and the polymer electrolyte battery is often called a lithium polymer battery. In addition, the lithium ion battery is fabricated in various shapes such as a roll type, a polygonal type, and a pouch type.

Typically, a lithium secondary battery includes: an electrode assembly having positive electrode plates on which positive activation materials are coated, negative electrode plates on which negative activation materials are coated, and separators interposed between each of the positive electrode plates and each of the negative electrode plates for preventing short circuits and allowing only lithium ions to pass through them; a lithium secondary battery case for containing the electrode assembly; and electrolyte injected into the battery case for enabling the lithium ions to travel.

Also, depending on the electrode used therein, the lithium secondary batteries can be classified into a lithium metallic battery and a lithium ion battery that use liquid electrolyte, and a lithium polymer battery that uses a polymer solid electrolyte.

In rectangular or cylindrical type lithium secondary batteries, aluminum or metallic cans are used as a case for containing the electrode assembly and the electrolyte. In pouch type lithium secondary batteries, a pouch is used as a case for containing them.

Typically, a pouch has a multi-layer structure consisting of a metallic foil layer and a synthetic resin layer covering it. In this case, the weight of the battery can be significantly reduced in comparison with a metallic can. In the multi-layered pouch, aluminum is used as a material for the foil. A polymer film included in the inside layer of the pouch multi-layered film protects a metallic foil from the electrolyte and prevents short circuits among the positive and the negative electrodes, and the electrode terminals.

In order to provide a pouch type lithium secondary battery, first, an electrode assembly formed by stacking positive electrodes, separators, and negative electrodes or stacking and winding them is inserted into an opening of the pouch. Then, edges of the opening of the pouch are heated and melted with front and rear pouch films to seal the opening of the pouch containing the bare cell.

Subsequently, accessories or subsidiary structures such as a protection circuit module or a positive temperature coefficient (PTC) element are attached to the bare cell battery, thereby providing a core pack battery.

When the core pack battery is combined with a cover, a complete lithium secondary battery can be obtained. This type of complete structure may be often called a packed battery. A typical packed battery contains a plurality of bare cells and a common protection circuit in a single cover.

In this case, the cover is provided on an outer surface of the pouch to protect the outer surface which may be made of a relatively weak material. They are bonded by applying a thermally melted adhesive between the pouch and the cover and melting the adhesive.

However, such a conventional pouch has a problem that, because a thermally melted adhesive is applied to the pouch and the adhesive is heated, the electrode assembly contained in the pouch may be deteriorated. In other words, the electrode assembly is deteriorated by a high temperature of heat so that this may produce malfunction of a battery, or the electrode assembly may be exploded to cause an accident.

Additional problems may happen when the bare cell battery is floated in the cover and electrical connections are cut off because the cover should be naturally larger than the bare cell to contain the bare cell.

SUMMARY OF THE INVENTION

The present invention has been made to overcome the aforementioned problems, and an object of the present is to provide a lithium secondary battery, in which a size of an entire lithium secondary battery can be reduced even when a bare cell and an exterior cover of the bare cell are combined with each other, bad electrical connections can be prevented, and an adhesive can be applied in a pouch type lithium secondary battery as minimum as possible enough to ensure safe engagement between the pouch and the cover.

According to an aspect of the present invention, there is provided a lithium secondary battery comprising: a bare cell having an electrode assembly and a case for containing the electrode assembly; a protection circuit module connected to the bare cell; and a cover enclosing the protection circuit module and the bare cell and having an external terminal electrically connected to electrodes of the electrode assembly, wherein a part of the cover is a molded portion made of resin using a mold.

The bare cell may be a pouch type or a rectangular can type.

The resin may be made of a material selected from a group consisting of silicon, epoxy, and urethane, and the molded portion may be formed in a hot-melt method using a mold. The molded portion encloses an upper surface of the bare cell, the protection circuit module formed on the upper surface, and a lower surface of the bare cell, while the external terminal is exposed to outside.

The cover may have a pair of cover components to cover both wide surfaces of the bare cell, respectively, and the cover components are first and second hard covers made of metal or resin. In this case, the first and second hard covers may be symmetrical. Also, each of the first and second hard covers may have side cover portions extending from both long side edges of wide surfaces of the hard covers and enclosing at least a portion of side narrow surfaces of the bare cell.

Each of the side cover portions may have notches on its end that is not connected to the edges. The molded portion may be formed to enclose the side cover portions of the first and second hard covers. In this case, due to the notches, a mechanical strength of a lithium secondary battery exterior can be improved.

Further, both outer sides of the molded portion corresponding to the side narrow surfaces of the bare cell may be rounded. The molded portion may serve as a portion of an exterior of the cover as well as an adhesive for fixing the bare cell, the protection circuit module, and the cover.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, an exemplary embodiment of the present invention will be described in detail with reference to accompanying drawings, in which like reference numerals denote like elements.

Figure 1:
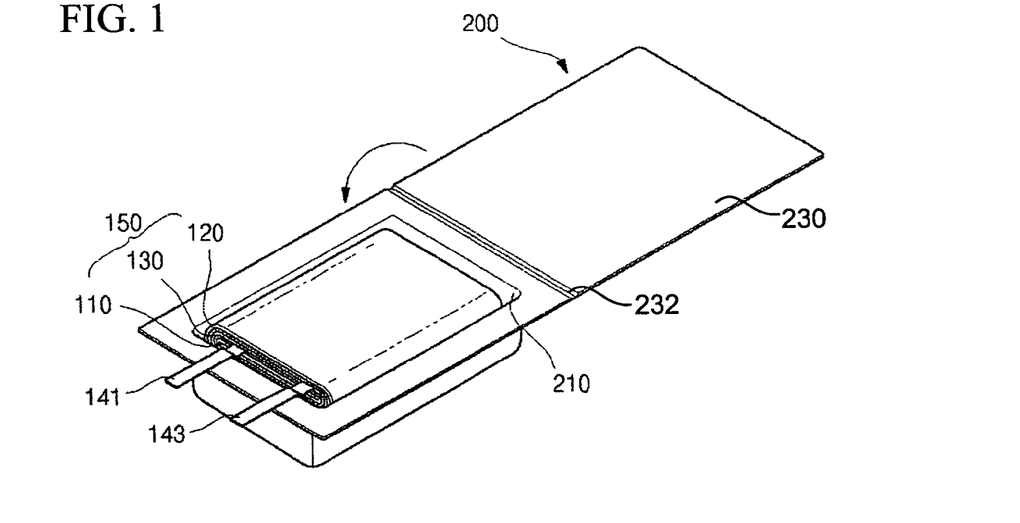
FIG. 1 is a perspective view illustrating a state that an electrode assembly is contained in a pouch in relation with a first embodiment of the present invention.
Figure 2:
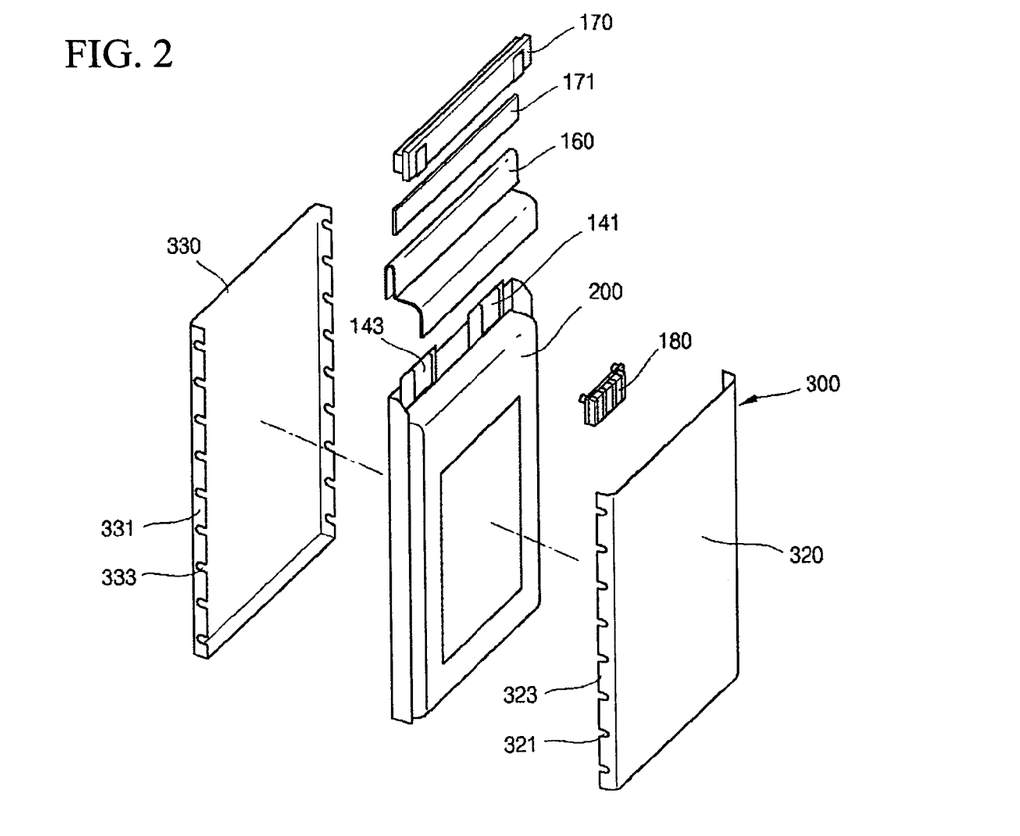
FIG. 2 is an exploded perspective view illustrating a pouch type secondary battery according to the first embodiment of the present invention.
Figure 3:
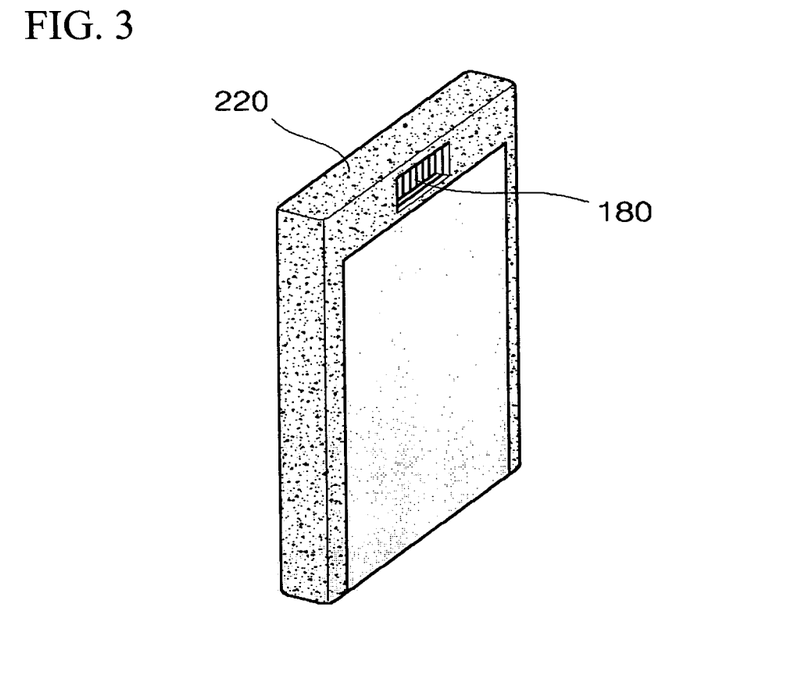
FIG. 3 is a perspective view illustrating a pouch type secondary battery according to the first embodiment of the present invention.

FIG. 1 is a perspective view illustrating a state that an electrode assembly is contained in a pouch in relation with an embodiment of the present invention, FIG. 2 is an exploded perspective view illustrating a pouch type secondary battery according to an embodiment of the present invention, and FIG. 3 is a perspective view illustrating a pouch type secondary battery according to an embodiment of the present invention.

Referring to FIGS. 1 through 3, a pouch type lithium secondary battery includes: an electrode assembly 150 having first and second electrode plates 110 and 120 and separators 130; a pouch 200 constituting a bare cell by inserting the electrode assembly 150 into it; a protection circuit module 170 electrically connected to the electrode assembly 150 and forcibly cutting off currents in an abnormal condition; and external terminal 180 electrically connected to the protection circuit module 170; a hard cover 300 covering at least a part of surfaces of the core pack formed by combining the bare cell, the protection circuit module 170, and the external terminal 180; a molded portion 220 (FIG. 3) formed by molding surrounding portions of the hard cover 300 that are not protected by the hard cover 300 for combining the core pack and the hard cover 300.

The electrode assembly 150 is made by stacking first and second electrode plates 110 and 120 on which first and second electrode activation materials are coated and a separator 130 interposed between the first and second electrode plates 110 and 120 for preventing short circuits between the first and second electrode plates 110 and 120 and allowing only lithium ions to travel and then winding them. From the first and second electrode plates 110 and 120, first and second electrode taps (terminals) 141 and 143 are extracted, respectively.

It should be noted that the first electrode terminal 141 is a positive electrode (i.e., cathode), and the second electrode terminal 143 is a negative electrode (i.e., anode).

The positive activation material may be chalcogenide compounds, e.g., metallic oxide compounds such as $LiCoO_2$, $LiMn_2O_4$, $LiNiO_2$, $LiNi_1\text{-}xCoxO_2(0<x<1)$, $LiMnO_2$, and the like. The negative activation material may be selected from a group consisting of a carbon based material, Si, Sn, tin oxides, composite tin alloys, transition metal oxides, lithium metallic nitrides, or lithium metallic oxides. Typically, the positive electrode plate is made of an aluminum material, and the negative electrode plate is made of a copper material. The separator is usually made of polyethylene or polypropylene. However, the present invention is not intended to limit the materials to the aforementioned ones.

The pouch 200 is almost rectangular. In order to contain the electrode assembly 150 in the pouch 200, the pouch 200 may have a drawing portion 210 having a predetermined depth on one side, and the other side of the pouch 200 may be bent (forming a foldable flap 230 and bent hinge 232) in combination with the drawing portion 210 to cover it. The pouch 200 may have a multi-layered structure consisting of an aluminum core layer, a hot-melt layer formed on the aluminum core layer, and an insulation layer formed beneath the core layer. The hot-melt layer may be formed of a polymer resin such as CPP (Casted Polypropylene) that can function as an adhesive layer. The insulation layer may be formed of a resin material such as nylon or PET (Polyethylene Terephthalate). However, the present invention is not intended to limit the materials to the aforementioned ones.

On the other hand, the first and second electrode terminals 141 and 143 extracted to outside of the pouch 200 are connected to the protection circuit module 170 which cuts off currents in an abnormal condition such as a short circuit overheating or an overcharge. An insulation member 160 may be further arranged between the electrode terminals and the protection circuit module 170.

Further, the protection circuit module 170 is connected to an external terminal 180 exposed to outside by a connection lead 171. The external terminal 180 is directly coupled to an external power source when the battery is charged.

The hard cover 300 is capable of containing the pouch 200; the protection circuit module 170 connected to the pouch 200; and the external terminal 180. The hard cover 300 covers at least a part of the surfaces of the pouch 200. Preferably, the hard cover 300 covers maximum area surfaces to protect outer surfaces of the pouch 200.

In addition, the hard cover 300 may be divided into first and second hard covers 320 and 330.

If the drawing portion 210 is formed on one side of the pouch 200, the first hard cover 320 is combined with the surface having the drawing portion 210 in the pouch 200, while the second hard cover 330 is combined with the opposite surface (flap 230) to the drawing portion 210.

In edges of the long sides of the first and second hard covers 320, side cover portions 321 and 331 are formed to cover the side surfaces of the pouch 200. The side cover portions 321 and 331 have a plurality of notches 323 and 333 formed by cutting out part of their end sides to facilitate engagement of their overlapped portions.

That is, when the hard cover 300 is installed to enclose the pouch 200, while the side cover portions 321 and 331 corresponding to both side surfaces of the pouch 200 are floated by the notches 323 and 333, the side cover portions 321 and 331 overlap.

The resin molded portion 220 may be made of a hot-melt type resin as an insulation material for insulating the pouch. In addition, silicon, epoxy, or urethane may be used as the insulation material. However, the present invention is not intended to limit the materials to the aforementioned ones.

The molded portion 220 surrounds, the protection circuit module 170 (connected to the bare cell (200+150)) and the external terminal 180, which are included on an upper portion of the pouch 200. In addition, the molded portion 220 is formed around the side cover portions 321 and 331 of the hard cover 300 so that a part of the core pack that is not covered by the hard cover 300 and surrounding portions of the hard cover 300 can be included.

Now, a method of fabricating a pouch type lithium secondary battery according to an embodiment of the present invention will be described with reference to FIGS. 1 and 4.

Figure 4:
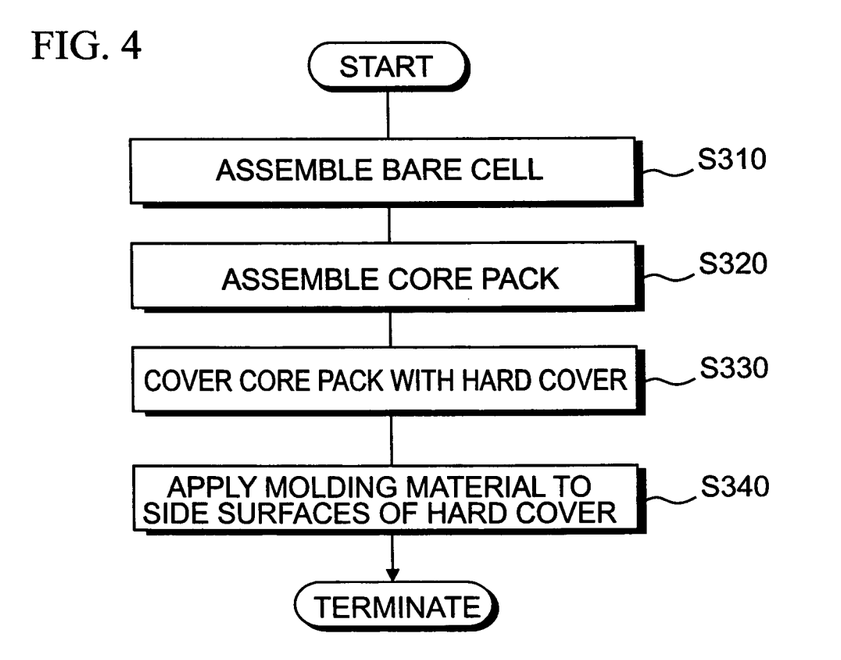
FIG. 4 is a flowchart illustrating a method of fabricating the pouch type secondary battery according to the first embodiment of the present invention.

Referring to FIGS. 1 and 4, first, an electrode assembly 150 is inserted into a drawing portion 210 formed in one side of a pouch 200.

The flap 230 of the pouch 200 is bent to cover the drawing portion 210 in their matched positions. It should be noted that first and second electrode terminals 141 and 143 connected to first and second electrode plates 110 and 120, respectively, of the electrode assembly 150 are extended to the outside of the pouch 200. After the flap 230 of the pouch is bent to cover the drawing portion 210, edges of the pouch 200 are sealed, thereby forming a bare cell (S310).

Then, near the electrode terminals 141 and 143 extending outside of the pouch 200, accessories such as protection circuit module 170 are arranged. The protection circuit 170 is electrically connected to the first and second electrode terminals 141 and 143 with the insulation member 160 interposed therebetween. Also, the protection circuit module 170 is electrically connected to external terminal 180, thereby forming a core pack (S320).

Both wide surfaces of the core pack, that is, outer surfaces including the side of the pouch on which the drawing portion 210 is formed and the other side of the pouch, flap 230, covering the drawing portion 210 are covered with the first and second hard covers 320 and 330, respectively. In this case, side cover portions 321 of the first hard cover 320 and side cover portions 331 of the second hard cover 330 are engaged with each other by the notches 323 and 333 that are movably overlapped. As a result, the core pack is covered with the hard cover 300 (S330).

Subsequently, a molding material 220 is applied to outer surfaces of the side cover portions 321 and 331 of the hard cover 300. It should be noted that the molding material 220 is also applied to an outer surface of an upper portion of the core pack on which the protection circuit module 170 and the external terminal 180 are provided (S340).

Accordingly, the pouch 200 is safely covered with the hard cover 300 and the molding material 220, while the molding material 220 is applied to the side surfaces and upper part of the hard cover 300.

Figure 5:
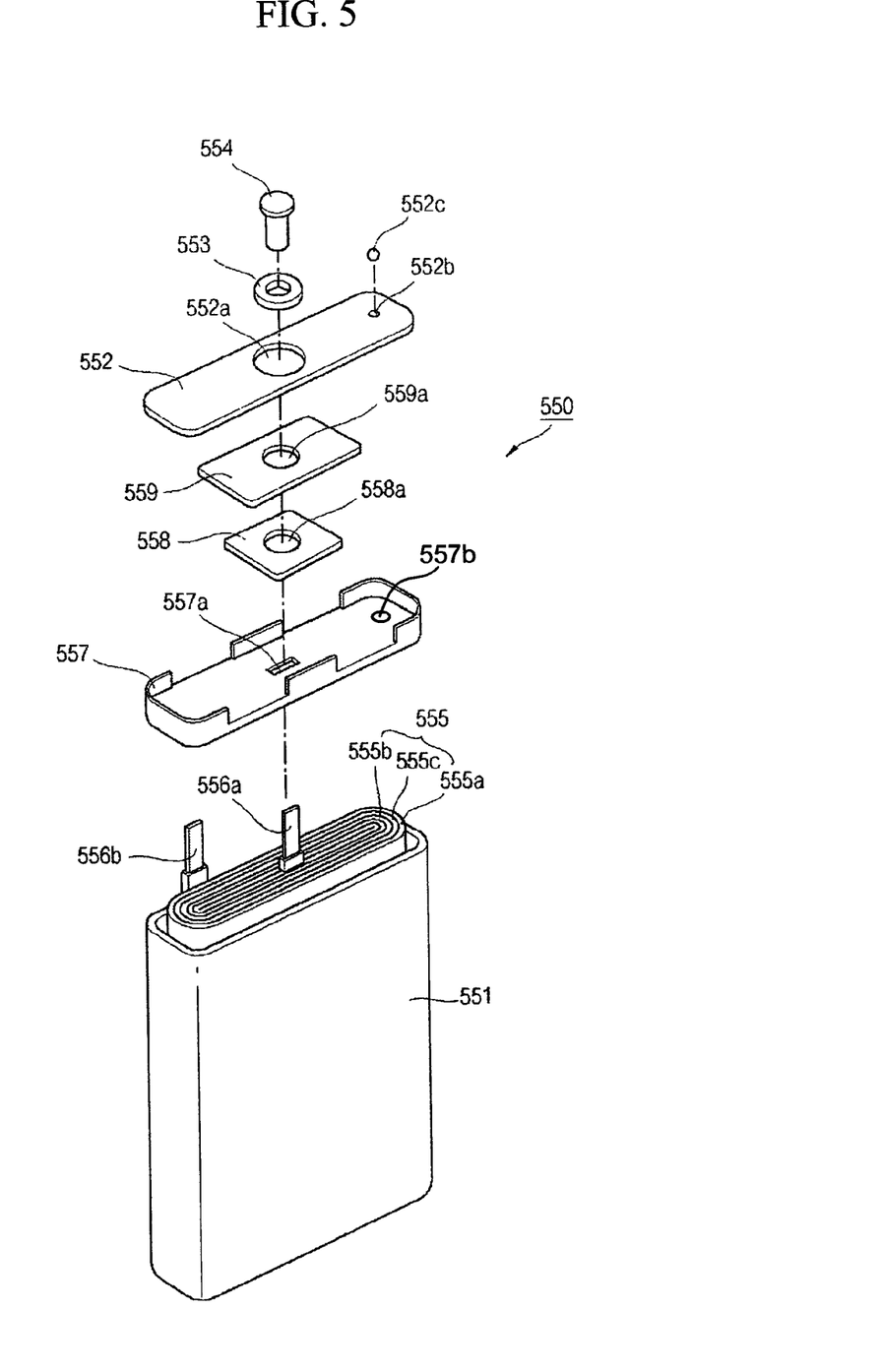
FIG. 5 is an exploded perspective view illustrating a bare cell constructed with a second embodiment of the present invention.
Figure 6:
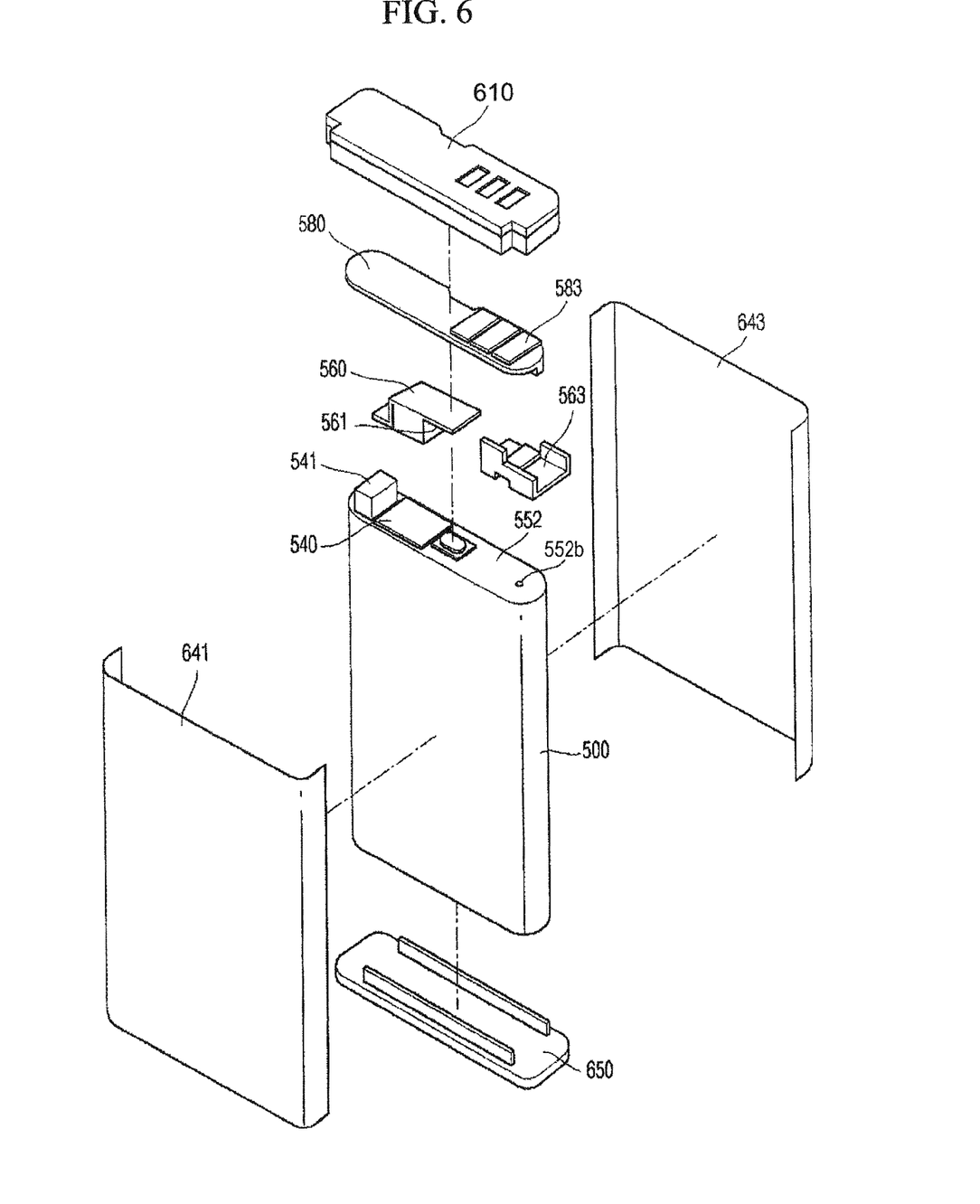
FIG. 6 is an exploded perspective view illustrating a battery pack constructed with the second embodiment of the present invention.
Figure 7:
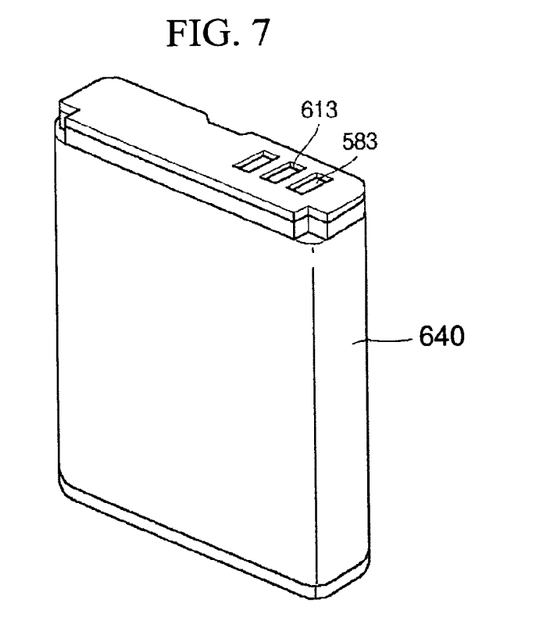
FIG. 7 is a perspective view illustrating a battery pack constructed with the second embodiment of the present invention.

FIG. 5 is an exploded perspective view illustrating a bare cell structure according to a second embodiment of the present invention; FIG. 6 is an exploded perspective view illustrating a lithium secondary battery according to the second embodiment of the present invention; and FIG. 7 is a perspective view illustrating a lithium secondary battery according to the second embodiment of the present invention.

Figure 8:
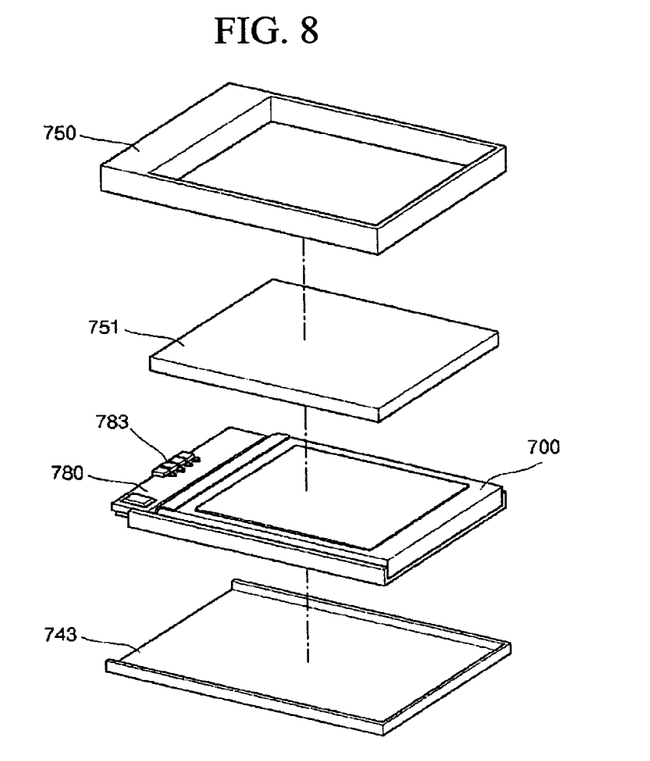
FIG. 8 is an exploded perspective view illustrating a battery pack constructed with a third embodiment of the present invention.
Figure 9:
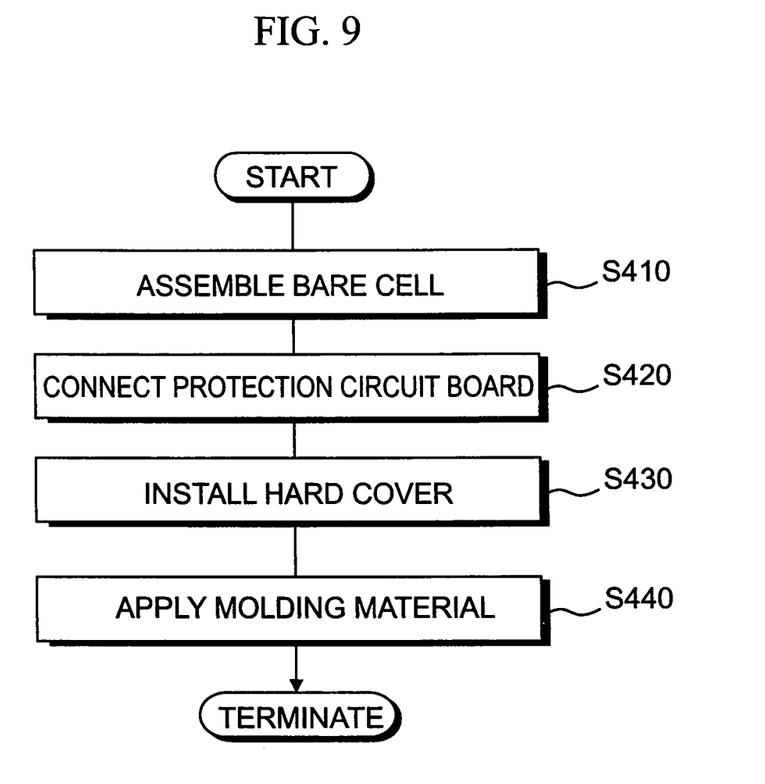
FIG. 9 is a flowchart illustrating a method of fabricating a battery pack according to the present invention.

FIG. 8 is an exploded perspective view illustrating a lithium secondary battery according to a third embodiment of the present invention; and FIG. 9 is a flowchart illustrating a method of fabricating a lithium secondary battery according to the present invention.

Referring to FIGS. 5 through 9, a battery pack according to the present invention includes: a bare cell 500; a protection circuit board 580 electrically connected to the bare cell 500; and an outer case 640 enclosing the bare cell 500.

In practice, the bare cell 500 functions as an energy source charged or discharged with a predetermined level of energy. More specifically, the bare cell includes a case 551; an electrode assembly 555 inserted into the case 551; a cap assembly 550 for capping the case 551; and electrolyte (not shown) injected into the case for allowing ions to travel in the electrode assembly 555.

The case 551 has a rectangular shape, substantially cubic, as shown in FIG. 5, and also has a positive or negative polarity.

The electrode assembly 555 includes a first electrode plate 555a; a second electrode plate 555b, and a separator 555c interposed between the first and second electrode plates 555a and 555b. They may be stacked and wound in a jelly roll shape, and then inserted into the case 551. In this case, first and second electrode terminals 556a and 556b extracted toward an upper direction are connected to the first and second electrode plates 555a and 555b, respectively.

The cap assembly 550 is arranged in an upper portion of the case 551. The cap assembly 550 is formed by combining an insulation case 557, a cap plate 552, a terminal plate 558, and an insulation plate 559 on the electrode assembly 555. Also, thru-holes 552a, 557a, 558a, and 559a are formed on the insulation case 557, the cap plate 552, the terminal plate 558, and the insulation plate 559, respectively, so that the electrode terminal 554 can pass through them from an upper portion of the electrode assembly 555.

In addition to the thru-hole 552a in the center of the cap plate 552, an electrolyte injection hole 552b may be provided on one side of the cap plate 552 and a corresponding electrolyte injection hole 557b may be provided on one side of insulating case 557. The electrolyte injection hole 557b may be sealed with an insulating material and the electrolyte injection hole 552b may be soldered with a solder ball 552c, after the electrolyte is injected through them. An insulation gasket 553 may be installed in the thru-hole 552a of the cap plate 552, and the electrode terminal 554 may be combined with the insulation gasket 553. Further, on the cap plate 552, are reenforcing member 541 is provided to reinforce the resin injected to connect an upper case 610.

In this case, the case 551 may be electrically positive, and the electrode terminal 554 may be electrically negative.

Meanwhile, the electrolyte (not shown) serves as a medium for delivering lithium ions generated by electrochemical responses in the positive and negative electrodes during the battery is charged/discharged. The electrolyte may be non-aquatic organic electrolyte which is a compound of lithium salt and high-purity organic solvents. Besides, the electrolyte may be a polymer electrolyte membrane.

As shown in FIG. 6, a protection circuit board 580, including at least one of a current cutoff device for cutting off currents by detecting heat and an overcharge protection device, is electrically connected to the bare cell 500. That is, the protection circuit board 580 includes various protection circuits such as a positive temperature coefficient (PTC) element 560 on a printed circuit board (PCB). In addition, a plurality of external terminals 583, exposed to the outside via openings 613 in upper case 610, are formed on a surface of the protection circuit board 580.

It should be noted that an insulation member 540 is interposed between the bare cell 500 and the protection circuit board 580 to provide insulation between them. That is, the insulation member 540 is to prevent a short circuit generated when various electronic components on the protection circuit board 580 make contact with the bare cell 500.

Meanwhile, an external case 640 may be divided into first and second external cases 641 and 643 to cover one wide surface and the other wide surface of the bare cell 500, respectively. A lower case 650 may then be fixed to the first and second external cases 641 and 643 to cover the remaining uncovered portion of the bare cell. Thus, external case 640 comprises upper case 610, first and second external cases 641 and 643, and lower case 650.

Alternatively, a molding material may be applied, through a mold, to the bare cell 500. In this case, the external case 640 may be formed of a non-metallic material such as plastic resin. Since the plastic resin is used in the external case 640, the weight and thickness of the case can be significantly reduced in comparison with a metallic material. Also, the external case 640 may have rounded corners, so that a contact area and friction between the battery pack and an electronic device in which the battery pack will be installed can be reduced. Preferably, the thickness of the external case 640 is less than 0.1 mm to minimize its size.

The PTC element 560 on the protection circuit board 580 has an infinite electrical resistance when the temperature of the bare cell 500 exceeds a predetermined level. The PTC element 560 is to control charge/discharge of the bare cell 500 when it is exposed to a high temperature environment and prevent breakdown of the bare cell 500 by opening the protection circuit when the bare cell 500 is excessively charged/discharged.

The protection circuit board 580 is electrically connected to the bare cell 500 via the first and second electrode leads 561 and 563. A first electrode terminal 556b can be welded to the cap plate 552 connected to the first electrode 555a and first electrode lead 561, and a second electrode terminal 556a can be welded to the electrode terminal 554 connected to the second electrode 555b and second electrode lead 563.

Surrounding portions including the protection circuit board 580 arranged in an upper portion of the bare cell 500, a lower portion of the bare cell 500, and both narrow side surfaces of the first and second external cases 641 and 643 covering the wide front and rear surfaces of the bare cell 500d are molded with a molding material.

FIG. 8 illustrates a third embodiment of the present invention, in which a pouch type case is used.

The bare cell 700 formed by inserting an electrode assembly into a pouch has a rectangular shape, and a protection circuit board 780 is electrically connected to the bare cell 700. Then, the pouch is covered with a pair of first and second hard covers 751 and 743, in which the external terminal 783 is exposed to outside. With the hard covers 751 and 743 installed, the pouch and the protection circuit assembly are inserted into a mold, and a hot melt is injected into the mold. As a result, the illustrated molded portion 750 covers upper, lower, and side surfaces of the pouch that are not covered with the hard covers. Although not shown in the drawings, the molded portion 750 may have an opening in order to allow the external terminal 783 to be exposed.

Now, with reference to FIG. 9, procedures for fabricating a battery pack having the aforementioned structure according to the present invention will be described in more detail.

The electrode assembly is inserted into the case with the first and second electrode terminals being exposed to outside of the rectangular or pouch type case, and then, sealed with the cap assembly, thereby providing a bare cell (S410).

Then, an insulator is disposed on a top surface of the bare cell, that is, an outer surface of the cap plate, and the first and second electrode terminals of the bare cell are electrically connected to the protection circuit board (S420).

Then, first and second hard covers are installed to cover both wide surfaces of the bare cell (S430).

Subsequently, a molding material is applied to surrounding portions of the hard covers, the molding material being formed of plastic resin through a molding injection hole. The molding material is injected onto upper and lower portions of the hard cover to fix the hard covers, the bare cell, and the protection circuit board (S440) with the molding material.

As described above, in a pouch type lithium secondary battery according to the present invention, the bare cell and the protection circuit are fixed by applying a resin material to only a part of the cover. Therefore, it is possible to minimize application of the resin.

In addition, the cover may be divided into the first and second hard covers and combined with the bare cell. Therefore, it is possible to minimize the size of the hard cover, provide a clean exterior, and simplify the fabricating procedures.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined by the appended claims, and all differences within the scope will be construed as being included in the present invention.

What is claimed is:

1. A lithium secondary battery, comprising:
 a bare cell having an electrode assembly and a case containing the electrode assembly, the bare cell comprising a plurality of major surfaces separated by a plurality of minor surfaces;
 a protection circuit module disposed on one of the plurality of minor surfaces and electrically connected to the bare cell;
 an external terminal electrically connected to the protection circuit module;
 a hard cover exposing the external terminal and a portion of the protection circuit module with the portion being completely overlapped by the external terminal, and the hard cover covering the protection circuit module and covering the bare cell, the hard cover comprising an inner surface facing towards the bare cell and an outer surface disposed opposite to the inner surface and facing away the bare cell; and a molded member made of resin and the molded member covering the protection circuit module and completely covering at least two of the plurality of minor surfaces which are different from the one of the plurality of the minor surfaces on which the protection circuit module is disposed, the molded member not disposed between the bare cell and the inner surface of the hard cover, wherein said hard cover has a pair of cover components to cover the plurality of major surfaces of the bare cell, wherein said pair of cover components are first and second sub hard covers made of metal or resin, wherein each of the first and second sub hard covers has two side cover portions extending respectively from two opposite long side edges of wide surfaces of the each of the first and second sub hard covers and enclosing at least one of the plurality of minor surfaces of the bare cell, wherein the two side cover portions of the each of the first and second sub hard covers have notches along their longest edges, and wherein both of the side cover portions having the notches are engaged by overlapping.

2. The lithium secondary battery according to claim 1, wherein the bare cell is made by inserting the electrode assembly into a pouch case forming said case and sealing surrounding portions of the pouch case, with electrode terminals of the electrode assembly extracted to outside the pouch case.

3. The lithium secondary battery according to claim 2, wherein the pouch case comprises:
a drawing portion having a predetermined depth on a first side for receiving said electrode assembly; and
a foldable flap foldable at a bent hinge to cover said drawing portion and said electrode assembly.

4. The lithium secondary battery according to claim 1, wherein the resin is made of a material selected from a group consisting of silicon, epoxy, and urethane.

5. The lithium secondary battery according to claim 1, wherein the molded member is formed in a hot-melt method using a mold.

6. The lithium secondary battery according to claim 1, wherein the first and second sub hard covers are symmetrical.

7. The lithium secondary battery according to claim 1, wherein the molded portion is formed to enclose the side cover portions of the first and second sub hard covers.

8. The lithium secondary battery according to claim 1, wherein the molded member is formed to enclose the side cover portions of the first and second sub hard covers.

9. The lithium secondary battery according to claim 8, wherein the molded member corresponding to minor surfaces disposed adjacent to the protection circuit module has curved surfaces.

10. The lithium secondary battery according to claim 1, wherein the molded member encloses an upper surface of the bare cell, the protection circuit module formed on the upper surface, and a lower surface of the bare cell.

11. The lithium secondary battery according to claim 10, wherein the molded member serves as a portion of an exterior of the cover as well as an adhesive for fixing the bare cell, the protection circuit module, and other components of the cover.

12. The lithium secondary battery according to claim 1, wherein the protection circuit module includes at least one of a current cutoff device for cutting off currents by detecting heat and an overcharge protection device.

13. The lithium secondary battery according to claim 1, wherein the bare cell is formed by inserting the electrode assembly into an opening of a rectangular can forming said case, and finishing the opening with a cap assembly having a cap plate.

14. The lithium secondary battery according to claim 1, wherein the cover is divided into a pair of resin cover components enclosing two wide side surfaces the bare cell, and the resin cover components have a thickness of 0.1 mm or less.

15. A lithium secondary battery, comprising:
a bare cell having an electrode assembly and a case containing the electrode assembly, the bare cell comprising a plurality of major surfaces separated by a plurality of minor surfaces;
a pair of electrode terminals extending from said electrode assembly to form two opposite polarities for said lithium secondary battery;
a protection circuit board cutting off currents by detecting overheating or an overcharge, said protection circuit board being electrically connected to the bare cell and disposed on one of the plurality of the minor surfaces of the bare cell;
an external terminal electrically connected to the protection circuit board;
a hard cover covering at least the plurality of major surfaces of the bare cell, the hard cover comprising an inner surface facing towards the bare cell and an outer surface disposed opposite to the inner surface and facing away the bare cell; and
a molded member exposing the external terminal and a portion of the protection circuit board with the portion being completely overlapped by the external terminal, covering said protection circuit board and completely covering at least two of the plurality of minor surfaces which are different from the one of the plurality of the minor surfaces on which the protection circuit board is disposed, the molded member not disposed between the bare cell and the inner surface of the hard cover,
wherein said hard cover has a pair of cover components to cover the plurality of major surfaces of the bare cell,
wherein said pair of cover components are first and second sub hard covers made of metal or resin,
wherein each of the first and second sub hard covers has two side cover portions extending respectively from two opposite long side edges of wide surfaces of the each of the first and second sub hard covers and enclosing at least one of the plurality of minor surfaces of the bare cell,
wherein the two side cover portions of the each of the first and second sub hard covers have notches along their longest edges, and
wherein both of the side cover portions having the notches are engaged by overlapping.

16. A method for forming a lithium secondary battery, said method comprising:
forming a bare cell by inserting an electrode assembly within a case and sealing said case, the bare cell comprising a plurality of major surfaces separated by a plurality of minor surfaces;
assembling a core pack by connecting external terminals to first and second electrode taps connected to said electrode assembly and by connecting said external terminals to a protection circuit module supported by a protection circuit board;
covering at least the plurality of major surfaces of the bare cell by a hard cover; and after the bare cell is covered by the hard cover, applying molding material through a mold to expose the external terminals and a portion of the protection circuit module with the portion being completely overlapped by the external terminal, and to cover said protection circuit module and to completely cover at least two of the plurality of minor surfaces which are different from the one of the plurality of the minor surfaces on which the protection circuit module is disposed.

* * * * *